(12) United States Patent
Gibson et al.

(10) Patent No.: US 11,574,255 B2
(45) Date of Patent: Feb. 7, 2023

(54) WORKSTATION MANAGEMENT SYSTEM

(71) Applicant: MILLERKNOLL, INC., Zeeland, MI (US)

(72) Inventors: Jeff Gibson, Zeeland, MI (US); Christopher Hoyt, Grand Rapids, MI (US); Brian Muse, Boston, MA (US); Zach Dunn, Boston, MA (US)

(73) Assignee: MILLERKNOLL, INC., Zeeland, MI (US)

( * ) Notice: Subject to any disclaimer, the term of this patent is extended or adjusted under 35 U.S.C. 154(b) by 495 days.

(21) Appl. No.: 16/621,746

(22) PCT Filed: Jun. 12, 2018

(86) PCT No.: PCT/US2018/037102
§ 371 (c)(1),
(2) Date: Dec. 12, 2019

(87) PCT Pub. No.: WO2018/231828
PCT Pub. Date: Dec. 20, 2018

(65) Prior Publication Data
US 2020/0104762 A1 Apr. 2, 2020

Related U.S. Application Data

(63) Continuation of application No. PCT/US2018/037098, filed on Jun. 12, 2018.
(Continued)

(51) Int. Cl.
*G06Q 10/02* (2012.01)
*A47B 9/00* (2006.01)
(Continued)

(52) U.S. Cl.
CPC ............. *G06Q 10/02* (2013.01); *A47B 9/00* (2013.01); *A47C 7/72* (2013.01); *G02B 6/0068* (2013.01);
(Continued)

(58) Field of Classification Search
CPC .................................................. G06Q 10/02
See application file for complete search history.

(56) References Cited

U.S. PATENT DOCUMENTS 7,232,069 B1   6/2007   White
8,577,711 B2   11/2013  Korecki et al.
(Continued)

OTHER PUBLICATIONS

Communication letter issued from the European Patent Office for related Application No. 18817542.6 dated Jan. 19, 2021 (1 Page).
(Continued)

*Primary Examiner* — Joseph H Feild
*Assistant Examiner* — Pameshanand Mahase
(74) *Attorney, Agent, or Firm* — Michael Best & Friedrich LLP (57) ABSTRACT

An intelligent furnishing system. The furnishing system includes an electronic device, a server, and a workstation. The workstation includes a short-range communication circuit, a user interface including a light source, and an electronic processor. The electronic processor is configured to receive a reservation including a reservation start time, increase a communication range of the short-range communication circuit when the reservation start time is a predetermined period of time from a current time, and receive a proximity signal from the electronic device. The electronic processor is also configured to illuminate the light source in a first color, receive a check-in signal when the proximity signal is received, change the light source from the first color to a second color, receive a check-out signal when the
(Continued)

check-in signal is received, and change the light source from the second color to a third color when the check-out signal is received.

6 Claims, 6 Drawing Sheets

Related U.S. Application Data

(60) Provisional application No. 62/518,333, filed on Jun. 12, 2017.

(51) Int. Cl.
*A47C 7/72* (2006.01)
*G05B 15/02* (2006.01)
*H04W 4/80* (2018.01)
*F21V 8/00* (2006.01)

(52) U.S. Cl.
CPC .............. *G05B 15/02* (2013.01); *H04W 4/80* (2018.02); *A47B 2200/0062* (2013.01); *A47B 2200/0066* (2013.01); *G05B 2219/25236* (2013.01); *G05B 2219/31229* (2013.01)

(56) References Cited

U.S. PATENT DOCUMENTS

| | | | |
|---|---|---|---|
| 9,665,848 B1 | 5/2017 | Johnson et al. | |
| 2002/0065688 A1 | 5/2002 | Charlton et al. | |
| 2014/0208685 A1* | 7/2014 | Sladojevic | B28B 7/0085 52/742.14 |
| 2014/0278594 A1 | 9/2014 | Vivadelli et al. | |
| 2015/0012307 A1* | 1/2015 | Moss | G06Q 10/02 705/5 |
| 2015/0138449 A1* | 5/2015 | Rawlinson | H04N 21/41422 348/837 |
| 2016/0127809 A1 | 5/2016 | Sigal et al. | |
| 2016/0135598 A1* | 5/2016 | Andoloro | A47C 1/0308 297/135 |

OTHER PUBLICATIONS

Communication letter issued from the European Patent Office for related Application No. 18816848.8 dated Jan. 19, 2021 (1 Page).
Extended Search Report issued from the European Patent Office for related Application No. 18817542.6 dated Dec. 16, 2020 (8 Pages).
Extended Search Report issued from the European Patent Office for related Application No. 18816848.8 dated Dec. 16, 2020 (7 Pages).
Communication received from the European Patent Office for related Applications No. 18816848.8 dated Mar. 28, 2022 (6 Pages.).

* cited by examiner

WORKSTATION MANAGEMENT SYSTEM

RELATED APPLICATIONS

This application is a U.S. national stage entry under 35 U.S.C. § 371 of International Patent Application No. PCT/US2018/037102 filed Jun. 12, 2018, which claims priority to U.S. Provisional Patent Application No. 62/518,333, filed Jun. 12, 2017. This application is also a continuation of International Patent Application No. PCT/US2018/037098 filed Jun. 12, 2018, which claims priority to U.S. Provisional Patent Application No. 62/518,333 filed Jun. 12, 2017. The entire content of all prior-filed applications is hereby incorporated by reference.

BACKGROUND

The present invention relates to office furnishings. In particular, the present invention relates to intelligent office furnishings.

SUMMARY

One embodiment provides an intelligent furnishing system including an electronic device, a server, and a workstation. The workstation includes a short-range communication circuit, a user interface including a light source, and an electronic processor. The electronic processor is configured to receive a reservation including a reservation start time, increase a communication range of the short-range communication circuit when the reservation start time is a predetermined period of time from a current time, and receive a proximity signal from the electronic device. The electronic processor is also configured to illuminate the light source in a first color and receive a check-in signal when the proximity signal is received. The electronic processor is further configured to change the light source from the first color to a second color when the check-in signal is received, receive a check-out signal, and change the light source from the second color to a third color when the check-out signal is received.

Another embodiment provides a method of reserving a workstation and implementing a reservation at the workstation. The method includes receiving, at an electronic device, a request to reserve a workstation and a plurality of search parameters associated with the request, transmitting the request and plurality of search parameters from the electronic device to a server, and determining, based on information included in a workstation database of the server, a list of workstations matching one or more of the plurality of search parameters. The method also includes transmitting the list of workstations from the server to the electronic device, receiving, with the electronic device, a selection of a workstation to reserve, and transmitting a reservation confirmation including the selected workstation and a reservation start time to the server from the electronic device. The method further includes transmitting user profile settings included in a user profile database of the server to the selected workstation based on which user requested to reserve the selected workstation. The user profile settings include preset positions for the workstation and a schedule of position changes. The method also includes activating, with an electronic processor included in the selected workstation, a presence sensor at the reservation start time and activating, with the electronic processor included in the selected workstation, a motor to adjust a position of the workstation to a first predetermined position based on the user profile settings when the presence sensor detects that a user is present at the workstation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Figure 1:
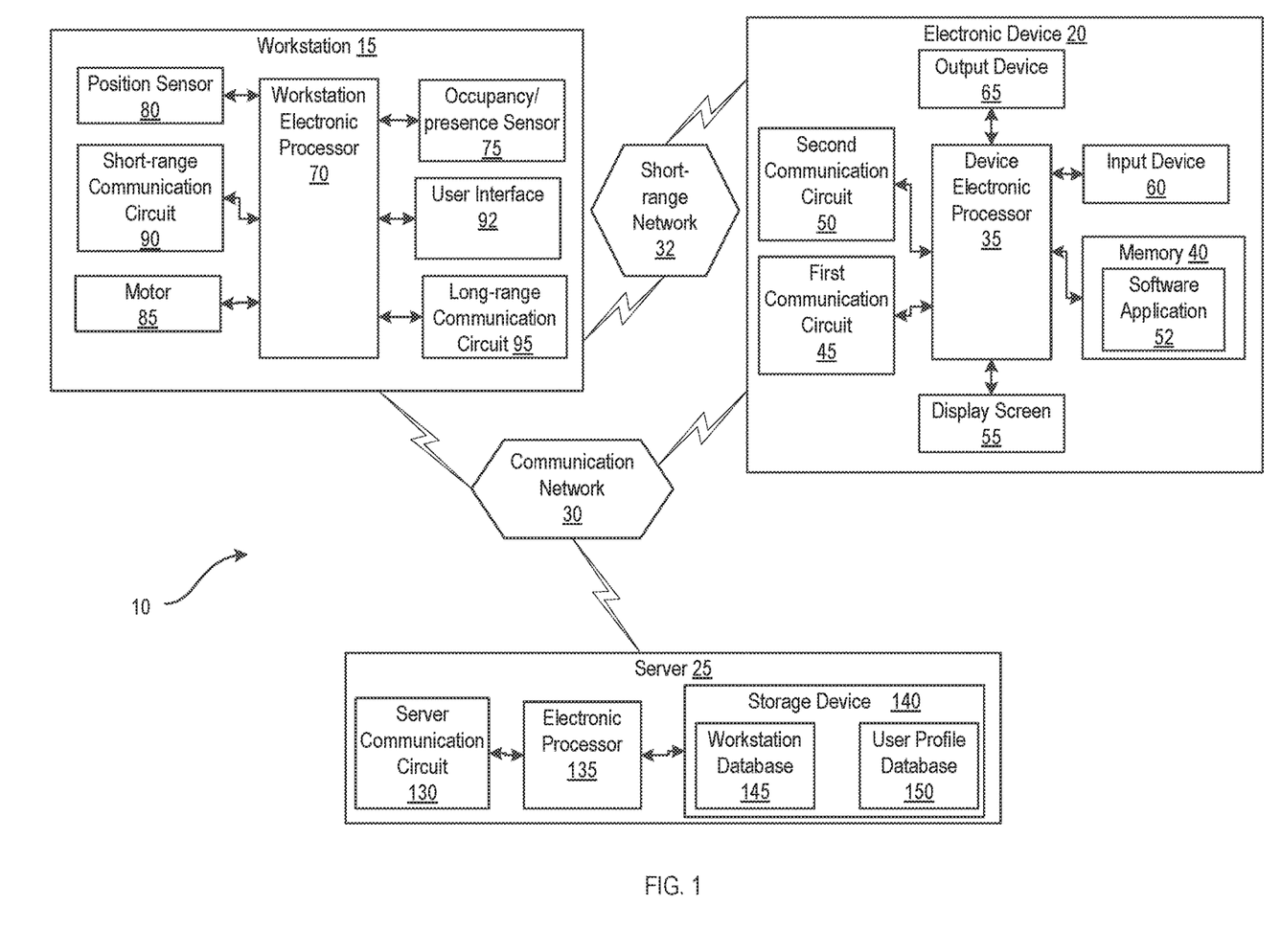
FIG. 1 is a block diagram of an intelligent furnishing system.

FIG. 1 illustrates an intelligent furnishing system 10 for managing use of workstations by various users. As shown in FIG. 1, the exemplary intelligent furnishing system 10 includes a workstation 15, an electronic device 20, and a server 25. The server 25 communicates with the electronic device 20 and the workstation 15 over a communication network 30. It should be understood that in some embodiments the system 10 may include fewer or additional components in various configurations. For example, the single workstation 15 shown in FIG. 1 is purely for illustrative purposes and more workstations may communicate with the server 25. Also, in some embodiments, the system 10 may include multiple servers that provide the functionality of the server 25 described herein in a distributed or cloud-based fashion.

The communication network 30 may be a wired network or a wireless network and may be implemented using a wide area network, such as the Internet, a local area network, such as Wi-Fi, or combinations or derivatives thereof. In some embodiments, the communication network 30 may be a Bluetooth® network or an ANT™ network. It should be understood that the workstation 15 and the server 25 may communicate over more than one communication network and different pairs of components may communicate over different networks. For example, as shown in FIG. 1, the workstation 15 communicates with the electronic device 20 over a second network 32. The second network 32 is a short-range wireless communication network such as a Bluetooth® network. Also, in some embodiments, the workstation 15 may communicate with the server 25 over a dedicated connection rather than a communication network.

The electronic device 20 communicates with the server 25 to find and reserve the workstation 15. The electronic device 20 may be, for example, a smart phone, tablet computer, laptop computer, smart watch, desktop computer, and the like. As shown in FIG. 1, the electronic device 20 includes a device electronic processor 35 (for example, a microprocessor, application-specific integrated circuit (ASIC), or another suitable electronic device), a memory 40 (for example, a non-transitory, computer-readable storage medium), a first communication circuit 45 (for example, a transceiver to communicate over the communication network 30), and a second communication circuit 50 (for example, to communicate over the short-range wireless network 32). The memory 40 stores a software application 52. As explained in more detail below, the software application 52 allows a user of the electronic device 20 to find, reserve, and utilize the workstation 15.

The electronic device 20 also includes a display screen 55, an input device 60, and an output device 65. In other embodiments, the electronic device 20 may include multiple input devices 60 and output devices 65. The input device 60 receives input from a user of the electronic device 20. The input device 60 may include, for example, a keyboard, a pointer device, a touchscreen, a touchpad, and the like. Analogously, the output device 65 provides output to the user of the electronic device 20 and may include, for example, a speaker, a vibration motor, and the like. In some embodiments, the electronic device 20 may include a single device that operates as both an input device and an output device, such as a touchscreen. It should be understood that the electronic device 20 may include additional components than those illustrated in FIG. 1 in various configurations and may perform additional functionality than the functionality described in the present application.

Each workstation 15 may be a furniture item such as, for example, a desk, a chair, a computer stand, and the like. In the illustrated embodiment, the workstation 15 refers to a desk, and, in particular, to a height-adjustable desk (commonly referred to as a sit-stand desk) that changes heights so a user can either sit or stand at the desk, such as the desk 100 shown in FIG. 2. It should be understood, however, that the desk may be a fixed height desk in some embodiments. In other embodiments the workstation 15 may refer to an adjustable chair such as, for example, an Aeron chair sold by Herman Miller of Zeeland, Mich. In yet other embodiments, the workstation 15 may refer to a group of furniture items such that, for example, the workstation 15 includes a desk, a chair, and a computer stand. As shown in FIG. 1, the workstation 15 includes a workstation electronic processor 70 (for example, a microprocessor, application-specific integrated circuit (ASIC), or another suitable electronic device), an occupancy or presence sensor 75, a position sensor 80, a motor 85, a short-range communication circuit 90, and a long-range communication circuit 95.

Figure 2:
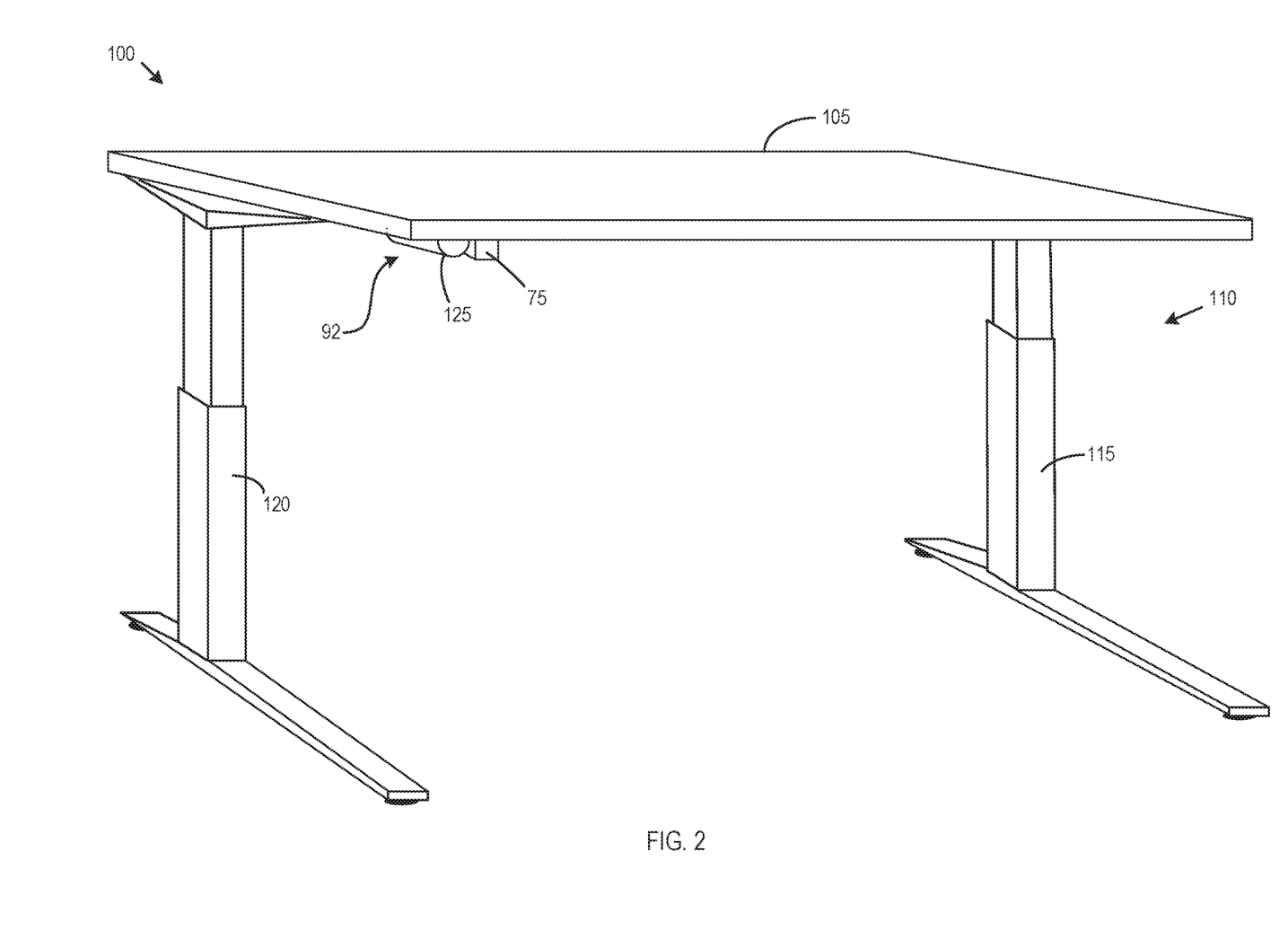
FIG. 2 is a perspective view of a desk as an exemplary workstation of the intelligent furnishing system of FIG. 1.

The occupancy or presence sensor 75 generates an output signal indicative of whether a user is present and/or currently occupying the workstation 15. In the illustrated embodiment, the presence sensor 75 is an infrared (IR) sensor. The presence sensor 75 detects changes in the infrared frequencies such as, for example, from 300 GHz to 1 THz. The presence sensor 75 detects when a person is nearby due to his/her body heat. Therefore, when a user is nearby (e.g., standing in front of the workstation 15), the presence sensor 75 (in the form of an IR sensor) detects a positive thermal output from the user's body. In contrast, when the user is remote from the workstation 15 (e.g., left the location of the desk), the presence sensor 75 detects a decreasing thermal output indicative of the ambient temperature or an unchanging thermal output. In other embodiments, a different sensor may be utilized as the presence sensor 75. In the illustrated embodiment, the presence sensor 75 is positioned near an actuator 125 (described in further detail below) and pointed toward the middle of the workstation 15, as shown in FIG. 2. In this position, the presence sensor 75 is pointed toward an expected location for the user, and can, therefore, more easily and more accurately determine whether a user is standing nearby. The presence sensor 75 sends the thermal output to the workstation electronic processor 70 to indicate whether the user is near the workstation 15 or remote from the workstation 15.

The position sensor 80 generates an output signal indicative of a position of at least one component of the workstation 15. For example, the position sensor 80 may include a height sensor, a rotation sensor, an angle sensor, and the like. In one example, the position sensor 80 indicates the height of the desk. That is, the position sensor 80 indicates a distance between a reference point (for example, the ground or a base of the desk) and, for example, a work surface of the desk. The position sensor 80 may alternatively provide an indication of a rotation of the workstation 15. For example, when the workstation 15 refers to a chair, the position sensor 80 may indicate a relative rotation of the chair seat. The position sensor 80 may alternatively or additionally indicate other positions of the workstation 15. For example, when the workstation 15 refers to a chair, the position sensor 80 may generate the output signal to indicate an angle between the backrest and the seat.

The short-range communication circuit 90 is, for example, a transceiver for communicating over the second network 32. In the illustrated embodiment, the short-range communication circuit 90 includes a Bluetooth® controller. In other embodiments, however, different communication protocols may be utilized to communicate over the second network 32. For example, the short-range communication circuit 90 may include transceivers and antennas to communicate via Wi-Fi®, Zig-bee®, Z-wave®, ANT™, near field communications, and the like. The short-range communication circuit 90 allows the workstation 15 to communicate directly with the electronic device 20 via the second network 32. In some embodiments, rather than, or in addition to, using a presence sensor 75 the short-range communication circuit 90 is used to detect the presence of the electronic device 20 at the workstation 15 within a predetermined range (for example, a three foot radius). Based on the detected presence of the electronic device 20, the workstation electronic processor 70 determines that a user is present at the workstation 15. The long-range communication circuit 95 is, for example, a transceiver for communicating over the communication network 30. The long-range communication circuit 95 allows the workstation 15 to communicate with the server 25 to, for example, provide a status of the workstation 15 to the server 25.

The motor 85 is coupled to a movable component of the workstation 15. For example, FIG. 2 illustrates the workstation 15 as a height-adjustable desk 100. As shown in FIG. 2, the desk 100 includes a work surface 105 and a support framework 110. The support framework 110 includes a right telescoping leg 115 and a left telescoping leg 120. The motor 85 (FIG. 1) is physically coupled (e.g., via gears, belts, pulleys, and/or other suitable mechanisms) to the support framework 110 to adjust the height of the right and left legs 115, 120 and thereby adjust the height of the work surface 105. In some embodiments, the motor 85 is physically coupled to only one of the legs 115, 120 and a second motor is physically coupled to the other one of the legs 115, 120. In such embodiments, each motor adjusts the height of each leg individually. In particular, the motor 85 adjusts the height of the desk 100 between a raised position (e.g., to be used while standing) and a lowered position (e.g., to be used while sitting). The motor 85 can also move the desk 100 to any intermediate height between the maximum height and the minimum height to adjust to specific user body types and seating and standing patterns. The motor 85 receives control signals to raise or lower the work surface 105 from the workstation electronic processor 70.

FIG. 2 also illustrates an exemplary user interface 92 of the workstation 15. The user interface 92 provides an indication to the user regarding the state of the workstation 15. For example, the user interface 92 provides an indication of whether the workstation 15 is currently occupied and/or reserved by a user, whether a change in position (e.g., from standing to sitting) is recommended, and the like. The user interface 92 also receives commands from the user regarding the workstation 15. For example, the user interface 92 receives a user input indicating whether movement of the workstation 15 is desired. In the illustrated embodiment, the user interface 92 includes an actuator 125. The actuator 125 serves as both an input device through which the user can indicate a desired motion or state of the workstation 15 (e.g., the desk 100), and as an output device to indicate the state of the workstation 15. In particular, the actuator 125 includes a light emitting diode (LED), or different light source, and a haptic motor such that the actuator 125 may be illuminated based on the state of the workstation 15 and also be able to provide haptic feedback to the user.

In the illustrated embodiment, the actuator 125 lights up green when the workstation (e.g., the desk 100) is available (that is, when the desk 100 is not being used or is reserved). In some embodiments, as described in more detail below with respect to FIG. 5, the actuator 125 lights up blue when the workstation is reserved, but the user has not arrived at the workstation (e.g., found the desk 100). Additionally, in some embodiments, the actuator 125 may also light up yellow if there is an error with, for example, the motor 85 and/or the workstation electronic processor 70. When the workstation 15 is occupied by a user, the actuator 125 may also provide feedback to the user regarding the status of the workstation 15. For example, when a user arrives and checks-in at the workstation 15, the actuator 125 may light up white. When the workstation electronic processor 70 determines that a change in position of the workstation 15 is recommended, the actuator 125 may, for example, pulse the white light to alert the user that a change in position is recommended. When the user leaves and indicates that the desk 100 can again become available (e.g., the user checks-out) via, for example, the software application 52, the actuator 125 may gradually change from white to green to indicate the desk is available. The actuator 125 may also generate haptic feedback with any of the indications described above in addition to or in lieu of providing the visual output with the LED.

As described above, the actuator 125 also allows the user to indicate whether any adjustment of the workstation 15 is desired. For example, in response to receiving the alert via the actuator 125 that a change in position is recommended, the user may tap the actuator 125 to confirm the change in position. The actuator 125 receives the user's input and indicates to the workstation electronic processor 70 that a change in position has been confirmed. The workstation electronic processor 70 may then generate a control signal to the motor 85 to change the position of the workstation 15. The motor 85 may then adjust the workstation 15 from a first predetermined position (e.g., a sitting height of approximately 33 inches) to a second predetermined position (e.g., a standing height of approximately 50 inches). The user may also input a manual position change via the actuator 125. For example, the actuator 125 may be divided in two sections such that when the user actuates a first section of the actuator 125, the desk 100 rises, and when the user actuates a second section of the actuator 125, the desk 100 lowers. For example, in one embodiment, when a user presses a top portion of the actuator 125, the workstation electronic processor 70 controls the motor 85 to raise the work surface 105, and when the user presses a bottom portion of the actuator 125, the workstation electronic processor 70 controls the motor 85 to lower the work surface 105. In such embodiments, the workstation electronic processor 70 may continue to raise or lower the work surface 105 until the user releases the actuator 125. In some embodiments, the user may also save new predetermined positions using the actuator 125.

Although the user interface 92 has been described with respect to the actuator 125, in other embodiments, the user interface 92 may include different components that provide feedback and receive commands from a user. For example, the user interface 92 may include virtual buttons, a keyboard, and the like. The workstation 15 also includes a power supply to provide power to its components. The power may be an AC power supply, or a battery pack attached to the workstation 15.

The workstation electronic processor 70 is electrically coupled to the position sensor 80, the presence sensor 75, the user interface 92, the communication circuits 90, 95, and the motor 85. The workstation electronic processor 70 uses the outputs from, for example the sensors 75, 80 and the communication circuits 90, 95 to, among other things, to determine whether to raise or lower the desk 100 and to what heights.

The server 25 communicates with the workstation 15 and the electronic device 20 to manage the use of the workstation 15 and to allow the user of the electronic device 20 to find and reserve the workstation 15. Although a single workstation 15 is shown in FIG. 1, the workstation 15 is representative of a plurality of workstations that are in communication with the server 25. For example, the plurality of workstations may be different hoteling workstations available within a company. In some embodiments, the workstation that communicate with the server 25 are at a similar location (e.g., within a single campus of an organization). In other embodiments, however, the server 25 communicates with workstations that are located remotely from each other.

As shown in FIG. 1, the server 25 includes a server communication circuit 130, an electronic processor 135, and a storage device 140. The communication circuit 130 includes, for example, a transceiver to communicate through the communication network 30. The electronic processor 135 may be, for example, a microprocessor, application-specific integrated circuit (ASIC), or another suitable electronic device. The storage device 140 (for example, a non-transitory, computer-readable storage medium) stores a workstation database 145 and a user profile database 150 as well as instructions (software) to be executed by the electronic processor 135. The workstation database 145 stores information about the workstations that are in communication with the server 25. As mentioned above, the workstations may be proximate to each other and/or may be located in remote areas (e.g., in different campuses for an organization). The workstation database 145 stores characteristics of each workstation 15 as well as a current state of the workstation 15. For example, the workstation database 145 associates each workstation 15 with a location (e.g., a GPS location and/or a relative location to other workstations or the building), a department or team within an organization, a schedule of available and unavailable times (e.g., the schedule may be hourly or by sections of the day such as, morning, afternoon, or all day), typical work activity performed at the workstation 15, typical level of noise at the workstation 15, typical amount of light available at the workstation, technology amenities of the workstation 15 (e.g., whether speakers, microphones, cameras, projectors, and the like are available), access to external amenities (e.g., whether the workstation 15 is close to a cafeteria, a vending machine, the library, and the like), and the proximity to other workstations and/or meeting spaces. These characteristics allow users to search for workstations that satisfy their criteria.

The user profile database 150 stores information regarding the various users of the intelligent furnishing system 10. In particular, the user profile database 150 associates each user with predetermined (preset) positions for the workstations (e.g., adjustable desks 100 and/or chairs), and schedules for changing positions of their workstation 15. For example, the user profile database 150 indicates that a first user has a predetermined standing desk height of approximately 55 inches, and a predetermined sitting desk height of approximately 33 inches. In some embodiments, these predetermined desk heights are determined specifically for the first user to enable ergonomic use of the workstation 15. For example, a user may consult a guide or an application to determine the best standing desk height for the user and the best sitting height for the user. The schedules to change the position of the workstation 15 are also based on individual preferences and goals. For example, a user may indicate that he/she would like to switch positions approximately every two hours, while a different user may indicate that he/she only wishes to switch positions approximately every three hours. In some embodiments, the schedules to adjust the position of the workstation 15 may be based on recommended periods for sitting and/or standing for specific types of users.

Figure 3:
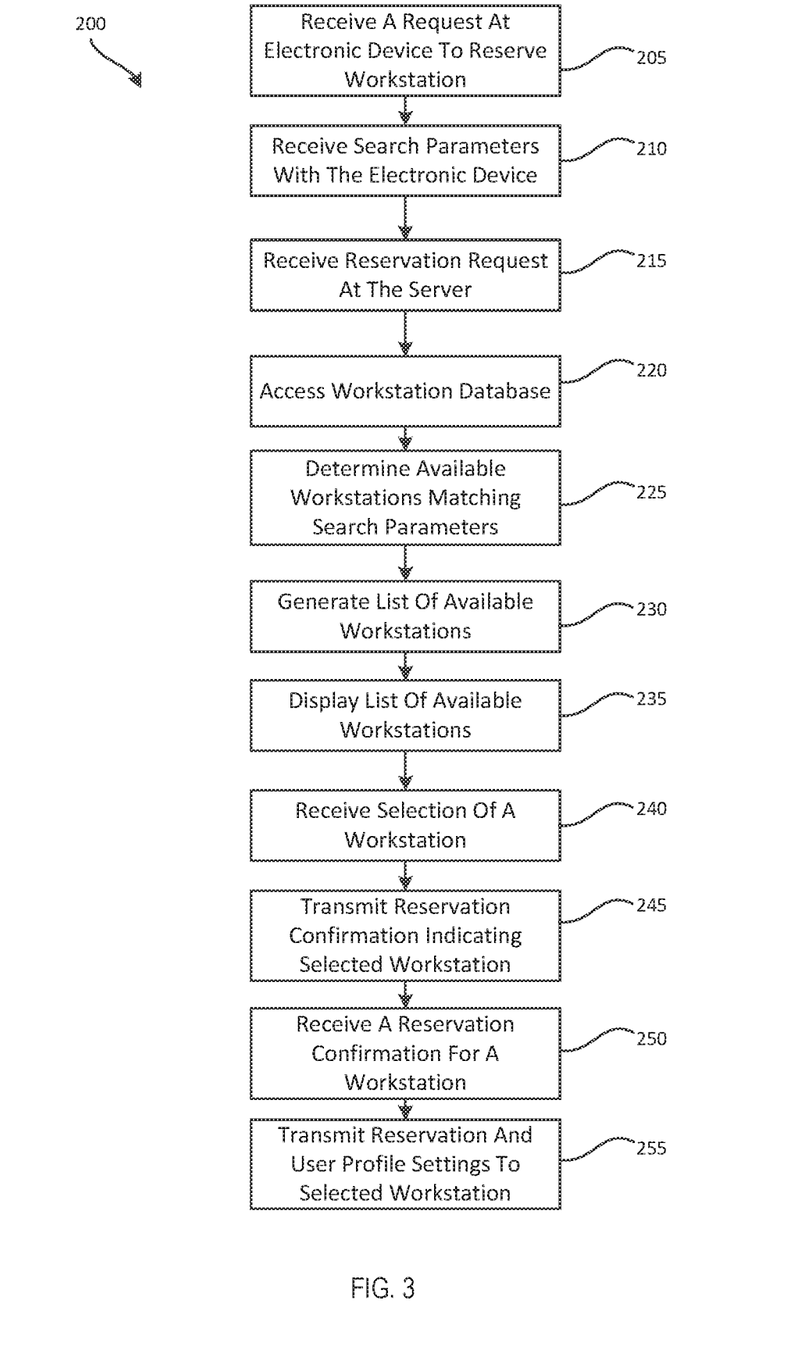
FIG. 3 is a flowchart illustrating a method of reserving a workstation with an electronic device of the intelligent furnishing system of FIG. 1.

FIG. 3 illustrates a method 200 of reserving a workstation with the electronic device 20. As shown in FIG. 3, the electronic device 20 receives a request to reserve a workstation from a user (block 205). In particular, the device electronic processor 35 launches the software application 52 and generates a graphical user interface. The device electronic processor 35 then receives the request to reserve a workstation (for example, the workstation 15) through the graphical user interface. The device electronic processor 35 also receives a plurality of search parameters via the graphical user interface (block 210). The user inputs the search parameters to indicate the desired characteristics of the workstation 15. For example, the search parameters may include the time period during which the workstation 15 is desired, as well as, for example, the location of the workstation 15 (e.g., a particular building and/or campus), technology available at the workstation 15, nearby amenities to the workstation 15, and the like. In particular, the search parameters may include one or more of the characteristics saved in the workstation database 145 with respect to each workstation. The electronic device 20 communicates with the server 25 to identify available workstations matching the search parameters received by the device electronic processor 35.

For example, the device electronic processor 35 generates a reservation request that is transmitted to the server 25. The reservation request may identify the received search parameters for the workstation 15. The server 25 receives the reservation request (block 215) and accesses the workstation database 145 in response to receiving the reservation request (block 220). The electronic processor 135 of the server 25 then determines the available (e.g., unreserved) workstations that match the received search parameters (block 225). The electronic processor 135 then generates a list of the available workstations that match the received search parameters (block 230). In some embodiments, the electronic processor 135 may also generate a list of available workstations that match most, but not all, of the received search parameters to provide additional workstation options to the user. In one example, the search parameters may include availability from 5 am to 11 am, proximity to a kitchen, and high amount of lighting available. The electronic processor 135 may then generate a list of workstations that match the three search parameters, and may also identify workstations that, for example, are available from 5 am to 11 am and have a high amount of lighting available, but are not near a kitchen. This feature may be useful when, for example, a workstation that matches all the received search parameters is not available and the user may want to look at additional workstation options.

The server 25 transmits the list (or lists) of available workstations to the electronic device 20 via the communication network 30. The device electronic processor 35 then displays the list of available workstations on the display screen 55 (block 235). The device electronic processor 35 may display the list of available workstations as a list on the display screen 55, or may generate a graphical representation of the available workstations such that the user can more easily identify the locations of the available workstations. The device electronic processor 35 then receives a selection of a workstation (for example, the workstation 15) to be reserved (block 240) via the graphical user interface, and transmits a reservation confirmation to the server 25 indicating the selected workstation 15 to be reserved (block 245). The reservation confirmation includes a message that indicates the selected workstation 15. In some embodiments, the reservation confirmation also indicates the period during which the workstation 15 is to be reserved.

The server 25 receives the reservation confirmation from the electronic device 20 (block 250), and transmits the reservation and user profile settings to the selected workstation 15 (block 255) in response to receiving the reservation confirmation. The reservation includes an indication of the user that reserved the workstation 15 and the period for which the workstation 15 is reserved. The user profile settings, as described above with respect to the user profile database 150, include preset positions for the workstation 15 associated with the user that reserved the workstation 15. In some embodiments, the server 25 may wait to transmit the reservation and/or user profile settings to the workstation 15 until the reservation time and/or until a user presence is detected at the workstation 15 at the reservation time.

Figure 4:
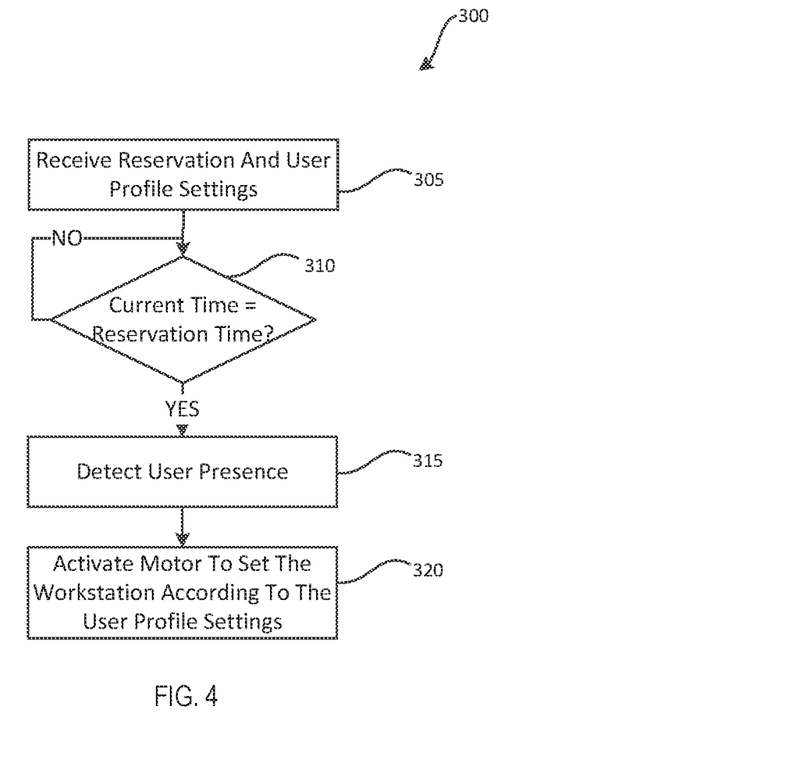
FIG. 4 is a flowchart illustrating a method of implementing a reservation at a workstation of the intelligent furnishing system of FIG. 1.

FIG. 4 illustrates a method 300 implemented by the workstation electronic processor 70 when the workstation 15 is reserved. As shown in FIG. 4, the workstation 15 receives the reservation and the user profile settings associated with the user for whom the workstation 15 is reserved (block 305). The reservation includes, for example, a reservation start time and a reservation end time. The user profile settings include, for example, a preset standing height, a preset sitting height, a schedule of position changes (e.g., how often the user switches from standing to sitting). As mentioned above, the reservation and the user profile settings may be received by the workstation 15 when the reservation is made by the user, and/or at the reservation time (or a predetermined time before the reservation time). The workstation electronic processor 70 then determines whether the current time matches the reservation time (block 310). That is, the workstation electronic processor 70 determines whether it is currently the reservation time. When the workstation electronic processor 70 determines that the current time does not yet match the reservation time, the workstation 15 remains in the same state (e.g., does not change position and may be in a sleep mode to conserve power). However, when the workstation electronic processor 70 determines that the current time matches the reservation time (e.g., it is currently the reservation time), the workstation electronic processor 70 activates the presence sensor 75 and detects user presence (block 315). After detecting the presence of a user, the workstation electronic processor 70 activates the motor 85 to set the workstation 15 at the user's profile settings (block 320). In some embodiments, the workstation electronic processor 70 automatically activates the motor 85 in response to detecting the presence of the user. In other embodiments, the workstation electronic processor 70 waits for a user input (for example, activation of the actuator 125), and activates the motor 85 in response to the user input.

Figure 5:
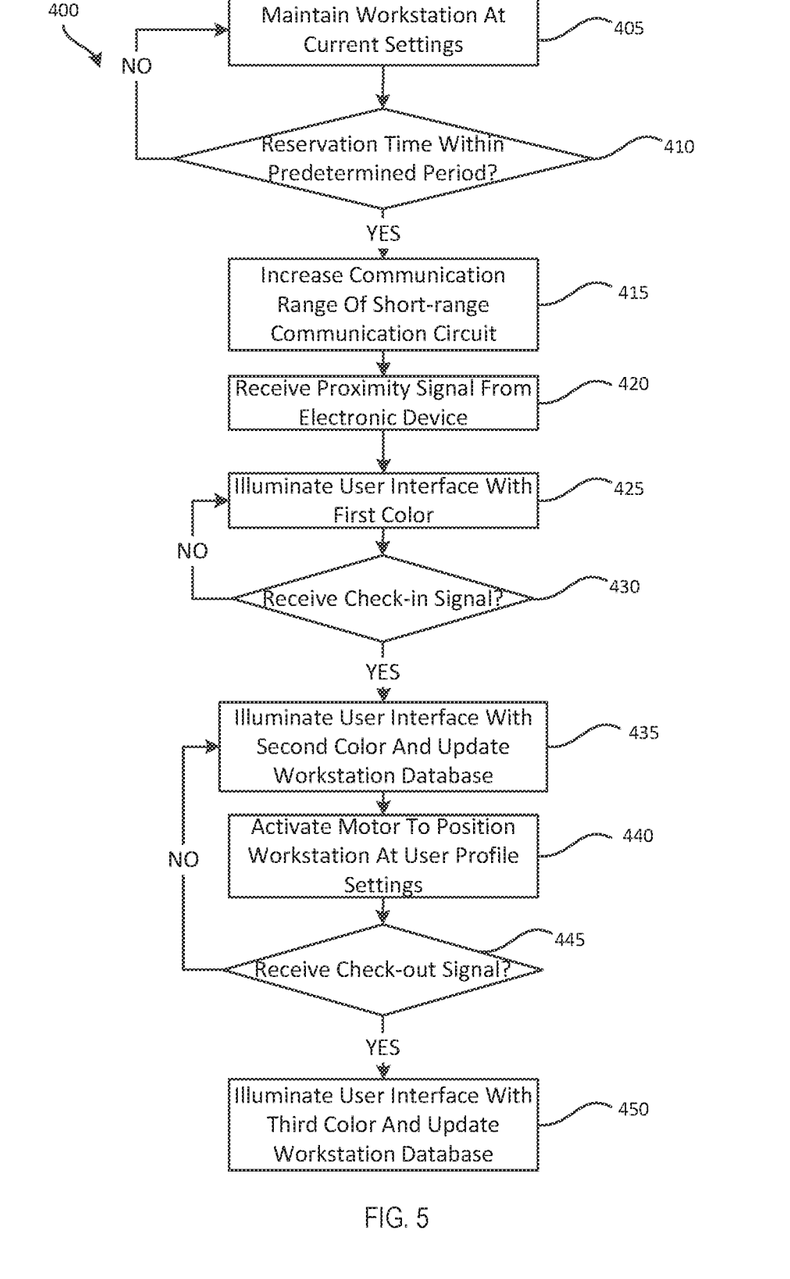
FIG. 5 is a flowchart illustrating a method of finding and using the workstation.

In some embodiments, the workstation 15 generates visual signals to help the user locate the workstation 15 (for example, when the workstation 15 is in a large area with multiple other workstations). FIG. 5 illustrates a method 400 of finding and using the workstation 15. As shown in FIG. 5, the workstation 15 remains at its current settings (block 405) until the reservation time is within a predetermined period (for example, the reservation time is within the next 10 minutes). When the workstation electronic processor 70 determines that the reservation time is within the predetermined period (block 410), the workstation electronic processor 70 increases the communication range of the short-range communication circuit 90 (block 415). The communication range may be increased by, for example, activating different and/or more antennas, providing more power to the transmissions, lowering a reception threshold so signals with lower power are detected, and the like.

The workstation 15 then receives a proximity signal from the electronic device 20 (block 420). Because the communication range of the short-range communication circuit 90 was increased, the proximity signal from the electronic device 20 may be received from further distances. The electronic device 20 broadcasts the proximity signal in response to receiving a user selection on the graphical user interface indicating that the workstation 15 is to be located. For example, the user selection may include an activation of a virtual "locate my workstation" button on the graphical user interface. In the illustrated embodiment, the workstation 15 illuminates the user interface 92 of the workstation 15 in a first color (e.g., blue) to help the user easily identify the workstation 15 (block 425). The electronic device 20 then also indicates to the user what the first color is. For example, the electronic device 20 may also illuminate a portion of the graphical user interface in the first color. The user may then locate the workstation 15 by finding the workstation illuminated in the first color. In some embodiments, the workstation 15 does not illuminate the user interface 92 in a first color (e.g., block 425 is bypassed). In such embodiments, the electronic device 20 may provide alternative help in locating the workstation 15. For example, the electronic device 20 may generate an indication of the proximity to the workstation 15 that is updated as the user moves. In such embodiments, the electronic device 20 will generate an indication of when the user is approaching the workstation 15 and when the user is distancing him/her from the workstation 15. In some embodiments, the electronic device 20 may generate and display turn-by-turn directions from the user's current position to the workstation. The electronic device 20 may generate the turn-by-turn directions based on, for example, GPS locations of the workstation and the user and/or based on preloaded maps of the facility housing the workstation 15.

The workstation electronic processor 70 then determines whether a check-in signal has been received (block 430). The check-in signal may be generated by the presence sensor 75 when the presence sensor 75 detects a user present at the workstation 15 and the reservation is within a predetermined period. In another example, the user checks-in via the software application 52 on the electronic device 20 (e.g., by pressing a "check-in" button on the graphical user interface generated by the software application 52). In some embodiments, the electronic device 20 sends the check-in signal (e.g., via the second communication circuit 50) to the workstation 15 when the electronic device 20 is within a predetermined proximity from the workstation 15. In other embodiments, the user checks-in via the user interface 92 of the workstation 15. For example, the user interface 92 may receive a tap indicating that the user is present at the workstation 15. In other embodiments, the user interface 92 includes an additional component to allow a user to check-in. For example, the user interface 92 may include a fingerprint reader or other biometric sensor, a number pad for a passcode input, and the like. While the check-in signal is not received, the workstation electronic processor 70 continues to illuminate the user interface 92 in the first color (block 425), and/or the electronic device 20 continues to provide guiding indications to the user.

Once the check-in signal is received by the workstation 15, the workstation electronic processor 70 illuminates the user interface 92 in a second color (e.g., white) to indicate that the workstation 15 is occupied, and updates the workstation database 145 to indicate that the workstation 15 is occupied (block 435). The workstation electronic processor 70 sends a message to the server 25 indicating that the check-in signal was received so that the state of the workstation 15 is updated in the workstation database 145. As described above with respect to block 320, the workstation electronic processor 70 activates the motor 85 to position the workstation 15 at the user's profile settings (block 440). The motor 85 may, for example, position the workstation 15 at the user's preset sitting position of 33 inches. The workstation electronic processor 70 then determines whether a check-out signal is received (block 445). The check-out signal may be generated by the presence sensor 75 when the presence sensor 75 does not detect a user at the workstation 15. In other embodiments, the user checks-out via the software application 52 on the electronic device 20 (e.g., by pressing a "check-out" button on the graphical user interface generated by the software application 52). In other embodiments, the user checks-out via the user interface 92 of the workstation 15. When the workstation electronic processor 70 receives the check-out signal, the workstation electronic processor 70 illuminates the user interface 92 in a third color (e.g., green) to indicate that the workstation 15 is available (e.g., unused and unreserved) at block 450. The workstation electronic processor 70 also updates the workstation database 145 to indicate that the workstation 15 is no longer occupied. For example, the workstation electronic processor 70 sends a message to the server 25 indicating that the check-out signal was received so that the state of the workstation 15 is updated in the workstation database 145. Otherwise, while the workstation electronic processor 70 does not receive the check-out signal, the workstation electronic processor 70 continues to illuminate the user interface 92 in the second color (e.g., white) at block 435 and setting the workstation 15 the user profile settings.

In some embodiments, the workstation electronic processor 70 automatically generates the check-out signal when, for example, the workstation electronic processor 70 does not receive the check-in signal within a predetermined period of time. That is, the workstation electronic processor 70 automatically checks-out a user when the user does not arrive at the workstation 15 within a predetermined period of time from the reservation time (e.g., 15 minutes after the reservation time). The workstation electronic processor 70 then makes the workstation 15 available at the workstation database 145 so other users may utilize the workstation 15.

In some embodiments, the workstation electronic processor 70 may generate a visual and/or haptic signal indicating to the user that the check-out time (e.g., when the reservation period expires) is approaching. The user may then request to extend the reservation time if the workstation 15 remains available. In some embodiments, the workstation electronic processor 70 automatically extends the reservation time when the workstation electronic processor 70 determines that the user remains present at the workstation 15 and that the workstation 15 in unreserved by a different user (e.g., remains available).

FIGS. 3-5 have been primarily described with respect to an embodiment in which the workstation 15 corresponds to a desk similar to that shown in FIG. 2. As discussed above, however, the workstation 15 may be or include a chair such as the chair 500 illustrated in FIG. 6. The chair 500 may be, for example, an Aeron chair sold by Herman Miller of Zeeland, Mich. The chair 500 includes various sensors that indicate the position and/or change in position of the chair 500.

Figure 6:
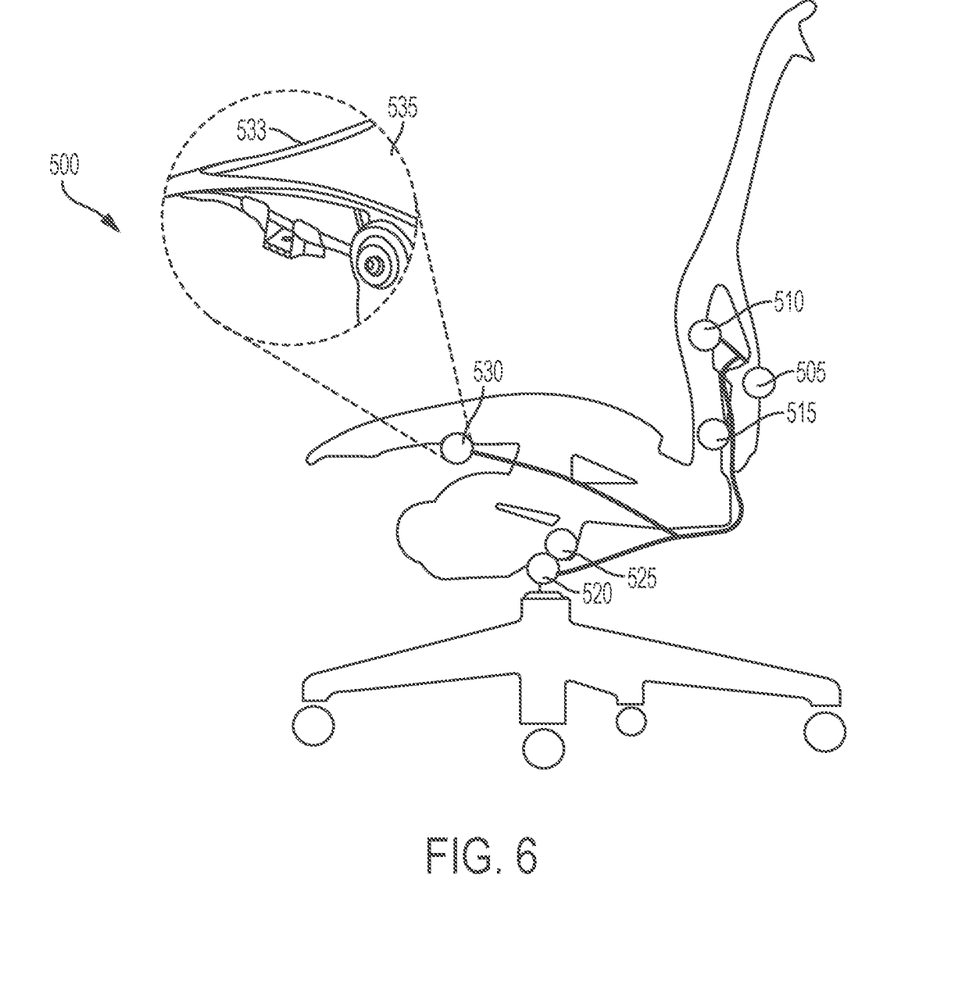
FIG. 6 is a perspective view of a chair as an exemplary workstation of the intelligent furnishing system of FIG. 1.

In the illustrated embodiment, the sensors of the chair 500 include an accelerometer 505, a set of capacitive sensors 510, 515, a height sensor 520, a rotation sensor 525, and an occupancy sensor 530. Each of these sensors may operate as the presence sensor 75 and/or the position sensor 80 described above with respect to the workstation 15. In some embodiments, the workstation electronic processor 70 may generate the check-in signal and/or the check-out signal based on the output of the chair sensors 505, 510, 515, 520, 525, and 530. The accelerometer 505 measures an acceleration of the chair 500 and generates a movement output indicative of a change in movement of the chair 500. In one embodiment, the accelerometer 505 may include a three-axis accelerometer. The change in movement of the chair 500 may be indicative of a change in location of the chair 500 (e.g., displacement about a room), an impact received by the chair 500 (e.g., to pair the chair 500 with a desk), or a change in position of the chair 500 (e.g., changing a reclining angle of the chair 500). In some embodiments, the chair 500 may alternatively or additionally include a vibration sensor that may replace the accelerometer 505. The vibration sensor generates a movement output when a vibration is detected on the chair 500 (e.g., a bump to the chair 500). In some embodiments, the workstation electronic processor 70 generates the check-in signal when the accelerometer 505 and/or the vibration sensor indicate movement of the chair 500 has been detected. In some embodiments, the workstation electronic processor 70 can also generate the check-out signal by monitoring the output of the accelerometer 505 and/or the vibration sensor, and detecting changes in the outputs of the accelerometer 505 and/or the vibration sensor. For example, the workstation electronic processor 70 may generate the check-out signal after determining that there have been no changes in the output of the accelerometer 505 and/or the vibration sensor in a predetermined period of time.

The set of capacitive sensors 510, 515 are positioned on a back of the chair 500, and determine the degree of engagement of the back of the chair 500 in supporting a user while sitting. The set of capacitive sensors 510, 515 includes a first capacitive sensor 510 and a second capacitive sensor 515. Each of the first capacitive sensor 510 and the second capacitive sensor 515 generates a pressure output indicative of a pressure exerted by the user on the back of the chair 500. Based on the individual outputs of the capacitive sensors 510, 515, the workstation electronic processor 70 can determine a more precise position of the user on the chair 500. In some embodiments, the workstation electronic processor 70 generates the check-in signal based on the output from the capacitive sensors 510, 515 and whether these indicate that a user is using the chair 500.

The height sensor 520 determines a height of the seat of the chair 500. In other words, the height sensor 520 determines a distance between the seat of the chair 500 and the bottom of a support structure of the chair 500. In one embodiment, the height sensor 520 is a time-of-flight sensor that transmits a signal (e.g., a light wave, an ultrasound wave, and the like). The height sensor 520 then waits for the signal to be reflected back toward the height sensor 520 and calculates a distance based on the time between the transmitted signal and the received reflected signal. In some embodiments, the workstation electronic processor 70 generates the check-in signal when the height sensor 520 determines a change in the height of the chair 500 (e.g., thereby indicating a manual change input by the user and/or an automatic change in height of the chair 500 based on, for example, a signal from the workstation electronic processor 70).

In the illustrated embodiment, the rotation sensor 525 includes a magnetometer that measures the direction of the earth's magnetic field and generates an angular output indicative of an angle from a reference position (e.g., when the magnetometer faces to the "front") to earth's magnetic north. The angular output of the magnetometer changes according to the rotation of the chair 500. In one example, as the chair 500 rotates to the right, the angular output of the magnetometer increases, and as the chair 500 rotates to the left, the angular output of the magnetometer decreases. In some embodiments, the rotation sensor 525 includes other types of sensors such as a gyroscope, an encoder, or a camera. The chair 500 may include more than one rotation sensor 525 to determine the rotation of the chair 500. The workstation electronic processor 70 may, for example, generate the check-in signal when the rotation sensor 525 indicates that the chair 500 is facing the "front," and may generate the check-out signal based on when the rotation sensor 525 indicates that the chair 500 no longer faces the "front." In other words, the workstation electronic processor 70 may generate the check-out signal based on when the chair 500 is rotated away from a desk (e.g., away from the "front").

The occupancy sensor 530 detects a condition of the chair 500. In particular, the occupancy sensor 530 determines whether a user is currently occupying (e.g., sitting on) the chair 500. The illustrated occupancy sensor 530 is positioned underneath and on a seat pan 533 of the seat of the chair 500, as shown in FIG. 6. In the illustrated embodiment, the seat pan 533 provides a support structure for a pellicle 535 that supports a user when the user sits on the chair 500. In other embodiments, the seat pan 533 may support other materials (e.g., a foam seat) that support the user when sitting on the chair 500. The occupancy sensor 530 includes a switch assembly that is switchable between a first position indicative of the chair 500 being vacant and a second position indicative of the chair 500 being occupied. When the chair 500 is vacant, the seat pan 533 is separated from the switch assembly. However, when the chair 500 is occupied, the weight of the user generates a downward and outward force that causes the seat pan 533 to move downward and activate the switch assembly. The workstation electronic processor 70 may then generate the check-in signal and/or the check-out signal based on the output of the occupancy sensor 530.

In embodiments in which the workstation 15 refers to a combination of a chair and a desk, any and/or multiple of the sensors discussed above may be used by the workstation electronic processor 70 to generate the check-in and/or check-out signals. The workstation electronic processor 70 may then operate as described above with respect to FIGS. 3-5 to reserve a specific workstation.

Although only one workstation 15 has been described as being reserved at a time, in some embodiments, the reservation request may be for a group of workstations. For example, if a particular team is working together, a member of the team may reserve a group of nearby workstations through the intelligent furnishing system 10. In some embodiments, the reservation request may also include the number of total workstations to be reserved and/or the names for which the additional workstations are reserved.

In some embodiments, the software application 52 may also generate a graphical user interface that allows a user to search for a user of interest. That is, the device electronic processor 35 receives a request to locate the user of interest and transmits a message to the server 25 including the request. The server 25 then accesses the workstation database 145 to determine which workstation is associated with the user of interest. The server 25 transmits a message back to the electronic device 20 indicating the workstation (for example the workstation 15) associated with the user of interest. The message may also indicate whether the user of interest is currently present at the workstation 15. The electronic device 20 then displays the workstation 15 associated with the user of interest, and may in some embodiments, provide directions and/or more location information so the user may find the workstation 15 associated with the user of interest.

In some embodiments, the electronic device 20 generates a graphical user interface that displays both a calendar view alongside the reserved desks for the user associated with the electronic device 20. Such a graphical user interface allows the user to easily identify whether a workstation has been reserved when he/she needs one.

In some embodiments, the workstation 15 is also associated with an external user interface in addition to the user interface 92. The external user interface may be, for example, battery powered and may provide reservation information. The external user interface may also be used for displaying reservation and/or availability information with respect to meeting spaces, open areas, and/or other reservable spaces. The external user interface may generate a similar graphical user interface as the software application 52 of the electronic device 20 such that reservations may also be requested and confirmed via the external user interface.

In some embodiments, a user may access the workstation database 145 to determine how to manage the different workstations. For example, in some embodiments, the user may access the workstation database 145 to determine which workstations are most heavily used and rotate said workstations with other workstations that may not be reserved as often. The information stored in the workstation database 145 may also be used to determine and/or generate cleaning schedules according to the number of times and/or how long each workstation is reserved. In some embodiments, for example, the electronic processor 135 may generate a recommendation for when particular workstations are to be cleaned and/or rotated (e.g., swapped with other workstations).

Thus, an intelligent furnishing system is configured to automatically change position of a workstation based on a reservation time and a detected user presence.

What is claimed is:

1. An intelligent furnishing system, the furnishing system comprising
    an electronic device;
    a server; and
    a workstation comprising a short-range communication circuit, a user interface including a light source, and an electronic processor configured to:
    receive a reservation including a reservation start time;
    when the reservation start time is a predetermined period of time from a current time, increase a communication range of the short-range communication circuit;
    receive a proximity signal from the electronic device;
    when the proximity signal is received, illuminate the light source in a first color;
    receive a check-in signal;
    when the check-in signal is received, change the light source from the first color to a second color;
    receive a check-out signal; and
    when the check-out signal is received, change the light source from the second color to a third color.

2. The furnishing system according to claim 1, wherein the electronic device is configured to transmit the proximity signal when the electronic device receives an indication, via an input device of the electronic device, that a user wants to locate the workstation.

3. The furnishing system according to claim 1, wherein the electronic device is configured to display, via a display screen of the electronic device, a calendar of a user alongside with workstations that the user has reserved.

4. The furnishing system according to claim 1, wherein when the proximity signal is received by the electronic processor, the electronic device is configured to display, via a display screen, the first color.

5. The furnishing system according to claim 1, wherein the electronic device is configured to display, via a display screen, a proximity of the electronic device to the workstation, and update the proximity when a location of the electronic device changes.

6. The furnishing system according to claim 1, wherein the electronic device is configured to display, via a display, screen directions from a location of the electronic device to the workstation.

\* \* \* \* \*